United States Patent
Sakuma

(10) Patent No.: US 9,262,842 B2
(45) Date of Patent: Feb. 16, 2016

(54) IMAGE PROCESSING APPARATUS AND IMAGE COMPRESSING METHOD

(71) Applicant: Konica Minolta, Inc., Tokyo (JP)

(72) Inventor: Keishi Sakuma, Saitama (JP)

(73) Assignee: KONICA MINOLTA, INC. (JP)

( * ) Notice: Subject to any disclaimer, the term of this patent is extended or adjusted under 35 U.S.C. 154(b) by 249 days.

(21) Appl. No.: 13/917,574

(22) Filed: Jun. 13, 2013

(65) Prior Publication Data

US 2013/0336584 A1  Dec. 19, 2013

(30) Foreign Application Priority Data

Jun. 19, 2012 (JP) .................................. 2012-137818

(51) Int. Cl.
G06T 9/00  (2006.01)
(52) U.S. Cl.
CPC ....................... G06T 9/00 (2013.01)
(58) Field of Classification Search
USPC ......................................................... 382/166
See application file for complete search history.

(56) References Cited

U.S. PATENT DOCUMENTS

| 7,158,669 | B2 * | 1/2007 | Tanaka | H04N 1/41 358/538 |
| 8,446,960 | B2 * | 5/2013 | Marpe | H04N 9/67 375/240.18 |
| 8,849,021 | B2 * | 9/2014 | Matsunaga | H04N 1/644 348/420.1 |
| 9,002,104 | B2 * | 4/2015 | Yamada | G06K 9/4652 382/162 |
| 9,020,254 | B2 * | 4/2015 | Yao | H04N 19/154 382/166 |
| 2010/0027882 | A1 | 2/2010 | Matsuoka | |

FOREIGN PATENT DOCUMENTS

| JP | 2010-35040 | 2/2010 | |
| JP | 2011-077580 | 4/2011 | |
| JP | 2011077580 | * 4/2011 | ............. H04N 1/387 |
| JP | 2011-193394 | 9/2011 | |

OTHER PUBLICATIONS

Notification of Reasons for Refusal issued by JPO for Appl. No. 2012-137818, dispatched Sep. 5, 2014, 2 pgs.
Translation of the Notification of Reasons for Refusal issued by JPO for Appl. No. 2012-137818, dispatched Sep. 5, 2014, 2 pgs.

* cited by examiner

Primary Examiner — Ishrat I Sherali
(74) Attorney, Agent, or Firm — Squire Patton Boggs (US) LLP

(57) ABSTRACT

Provided is an image processing apparatus for compressing an image. The apparatus includes a compressing section configured to compress an image based on N representative colors to generate N-representative-color-based compression data and calculate an indicator for evaluating an image quality of the image compressed based on M representative colors during compressing the image based on N representative colors, where M<N holds. The apparatus further includes a control section configured to compare the indicator and a threshold to judge whether a reduction of the number of representative colors of the N-representative-color-based compression data causes a deterioration of an image quality or not; and a converting section configured to reduce the number of the representative colors of the N-representative-color-based compression data to generate M-representative-color-based compression data in response to judging that the reduction of the number of the representative colors does not cause the deterioration of the image quality.

10 Claims, 11 Drawing Sheets

FIG. 5A
FIG. 5B
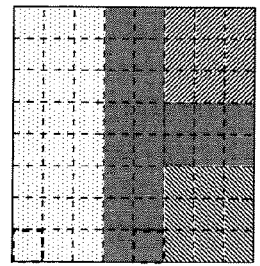
FIG. 5C
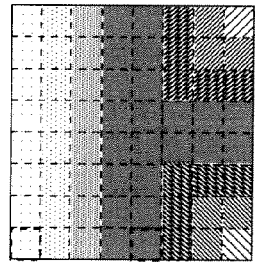
FIG. 5D
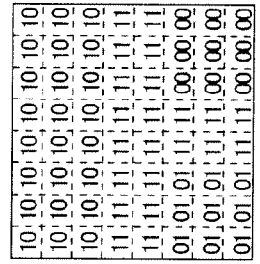
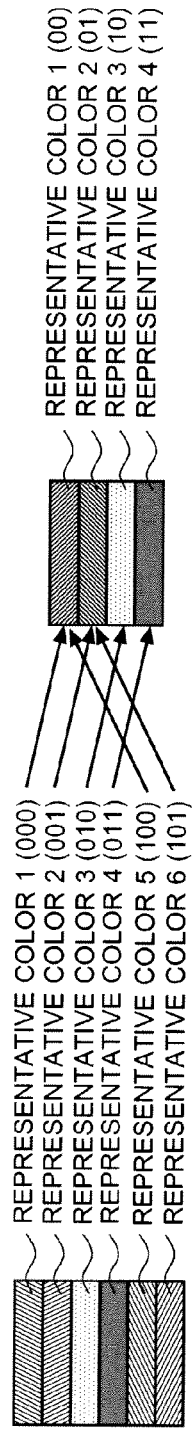
FIG. 6

| REGION1<br>RANGE VALUE OF R-COLOR: 2<br>RANGE VALUE OF G-COLOR: 4<br>RANGE VALUE OF B-COLOR: 2 | REGION2<br>RANGE VALUE OF R-COLOR: 3<br>RANGE VALUE OF G-COLOR: 3<br>RANGE VALUE OF B-COLOR: 1 |
|---|---|
| REGION3<br>RANGE VALUE OF R-COLOR: 6<br>RANGE VALUE OF G-COLOR: 2<br>RANGE VALUE OF B-COLOR: 2 | REGION4<br>RANGE VALUE OF R-COLOR: 1<br>RANGE VALUE OF G-COLOR: 3<br>RANGE VALUE OF B-COLOR: 4 |

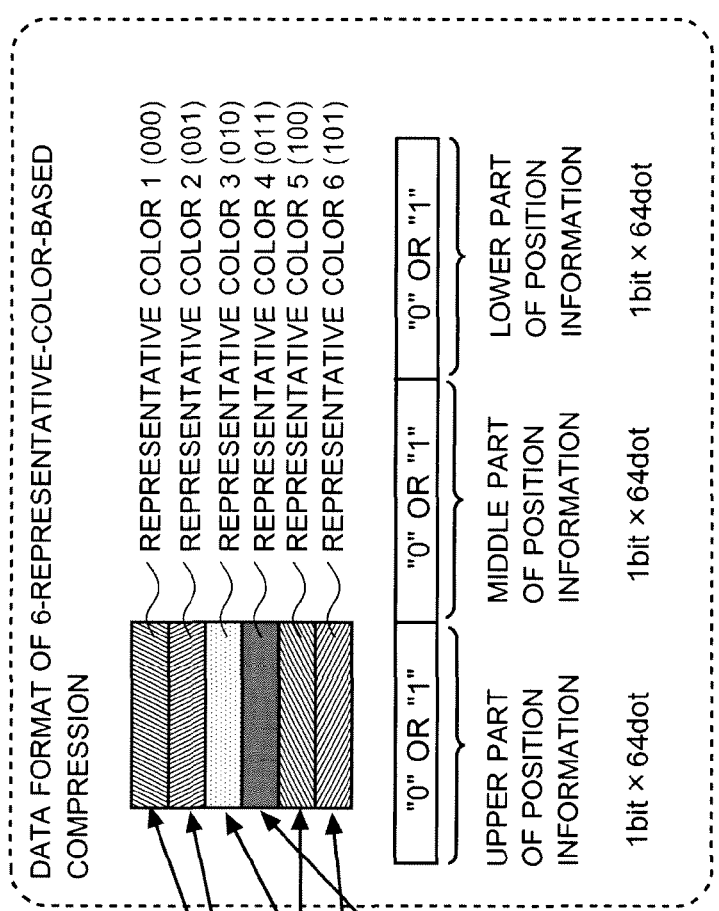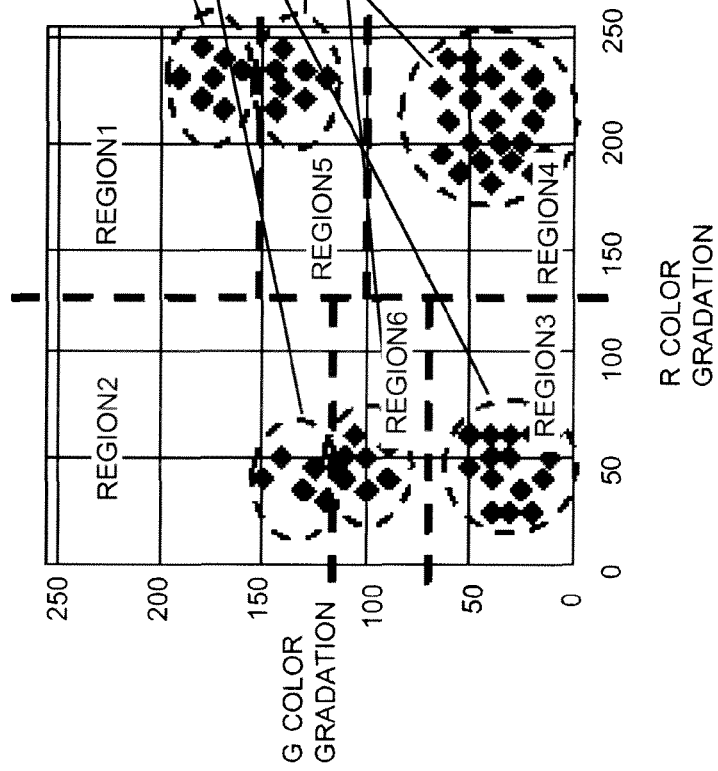

IMAGE PROCESSING APPARATUS AND IMAGE COMPRESSING METHOD

This application is based on Japanese Patent Application No. 2012-137818 filed on Jun. 19, 2012, in the Japan Patent Office, the entire content of which is hereby incorporated by reference.

TECHNICAL FIELD

The present invention relates to an image processing apparatus and image compressing method, and in particular, relates to an image processing apparatus configured to compress an image by replacing colors into representative colors and to an image compressing method for use in the image processing apparatus.

BACKGROUND

According to an image compressing method known as one of general image compressing techniques, an image is divided into specific blocks, representative colors are extracted from each block, and the color of each pixel in a block is replaced with one of the extracted representative colors.

Usually, in such an image compressing method, the number of extracted representative colors is fixed. Accordingly, in the case where the number of colors used in a block is larger than the number of predetermined representative colors, a color not applicable to any one of the representative colors is replaced with one of the representative colors (that is, the reduction of the number of colors occurs). As a result, image quality may deteriorate. Meanwhile, even in the case where image quality is not likely to deteriorate by compression based on the small number of representative colors, such as in the case where the number of colors contained in an image before compression is small, and in the case where an image is extremely monotonous, compression processing is performed by extracting the preset fixed number of representative colors. Accordingly, since the representative colors are extracted more than the necessary number, the data size after the compression processing becomes larger unnecessarily. As a result, high compression ratio is hardly attained.

With regard to the above problems, Japanese Unexamined Patent Publication (JP-A) No. 2011-193394 discloses the following technique. In an image processing apparatus configured to perform compression and extension for image data including color data for each dot, the number of colors of a dot group in a prescribed region is detected. Then, when the detected number of colors is a first number, the image data of the dot group in the prescribed region are subjected to compression and extension in a reversible compression manner. On the other hand, when the detected number of colors is a second number larger than the first number, the image data of the dot group in the prescribed region are subjected to compression and extension in a nonreversible compression manner.

As a technique to attain high compression ratio while suppressing image quality deterioration, it may be considered to perform compression processing again by increasing or decreasing the number of representative colors. However, the propriety of the number of representative colors cannot be judged unless compression processing is actually performed. Accordingly, the production of compression data takes much time. Further, the original image data are needed to be retained until the compression processing is completed. As a result, the original image data are obliged to occupy a memory.

Further, as another technique, it may be considered to evaluate an image of a compression target so as to determine the number of representative colors and to perform compression based on the determined number of representative colors. However, according to this technique, during the evaluation of the image of the compression target, the compression processing cannot be started. Accordingly, also, the production of compression data takes much time. Further, separately from the compression processing, processing to evaluate an image is needed to be added newly, which results in that the processing becomes complicate.

Furthermore, according to the technique of the above JP-A No. 2011-193394, when the number of colors of a divided block is equal to or larger than the predetermined number, the block is subjected to pseudo gradation. Meanwhile, when the number of colors of a block is less than the predetermined number, the block is made as it is. Then, compression is performed by recording a color arrangement and color information of each block, whereby it may be possible to suppress extraction of representative colors more than necessary. However, in this technique, color information data of at least the preset predetermined number are needed to be retained for the compression data of one block. Accordingly, if the predetermined number is larger than necessary, high compression ratio is hardly attained. Further, if compression processing has been once performed based on the predetermined number, it may be not possible to perform processing to further recompress the compression data by reducing the predetermined number later. Therefore, even in the case where image quality deterioration due to further compression is not acknowledged, the compression is hardly performed more than that. As a result, high compression ratio cannot be attained. The present invention seeks to solve the problem.

SUMMARY

There are disclosed illustrative image processing apparatuses and image compressing methods.

An illustrative image processing apparatus reflecting one aspect of the present invention is an image processing apparatus for compressing an image. The image processing apparatus comprises a compressing section configured to perform the following operations. The operations comprise: compressing the image based on N representative colors to generate N-representative-color-based compression data, and calculating an indicator for evaluating an image quality of the image compressed based on M representative colors during the compressing the image based on N representative colors, where N and M each represents the number of representative colors and satisfy M<N. The compressing the image includes dividing the image into a plurality of blocks, extracting representative colors from each of the blocks, and assigning one of the representative colors to each pixel in the blocks. The image processing apparatus further comprises a control section configured to compare the indicator and a predetermined threshold to judge whether a reduction of the number of representative colors of the N-representative-color-based compression data from N colors to M colors causes a deterioration of an image quality or not. The image processing apparatus further comprises a converting section configured to reduce the number of the representative colors of the N-representative-color-based compression data from N colors to M colors to generate M-representative-color-based compression data in response to judging that the reduction of the number of the representative colors does not cause the deterioration of the image quality.

Another illustrative image processing apparatus reflecting one aspect of the present invention is an image processing apparatus for compressing an image. The image compressing apparatus comprises a compressing section. The compression section is configured to perform operations comprising: compressing the image based on M representative colors to generate M-representative-color-based compression data and calculating an indicator for evaluating an image quality of the M-representative-color-based compression data during the compressing the image based on M representative colors. The compression section is further configured to perform operations, in response to judging that the image quality is low, comprising compressing the image based on N representative colors to generate N-representative-color-based compression data, where N and M each represents the number of representative colors and satisfy N>M. Each of the compressing the image based on M representative colors and the compressing the image based on N representative colors includes dividing the image into a plurality of blocks, extracting representative colors from each of the blocks, and assigning one of the representative colors to each pixel in the blocks. The image compressing apparatus further comprises a control section configured to compare the indicator and a predetermined threshold to judge the image quality of the M-representative-color-based compression data.

An illustrative image compressing method reflecting one aspect of the present invention is an image compressing method for compressing an image. The method comprises: performing the following operations. The operations comprise compressing the image based on N representative colors to generate N-representative-color-based compression data and calculating an indicator for evaluating an image quality of the image compressed based on M representative colors during the compressing the image based on N representative colors, where N and M each representing the number of representative colors and satisfying M<N. The compressing the image includes dividing the image into a plurality of blocks, extracting representative colors from each of the blocks, and assigning one of the representative colors to each pixel in the blocks. The method further comprises comparing the indicator and a predetermined threshold to judge whether a reduction of the number of representative colors of the N-representative-color-based compression data from N colors to M colors causes a deterioration of an image quality or not. The method further comprises reducing the number of the representative colors of the N-representative-color-based compression data from N colors to M colors to generate M-representative-color-based compression data in response to judging that the reduction of the number of the representative colors does not cause the deterioration of the image quality.

Another illustrative image compressing method reflecting one aspect of the present invention is an image compressing method for compressing an image, comprising: performing the following operations. The operations comprise compressing the image based on M representative colors to generate M-representative-color-based compression data and calculating an indicator for evaluating an image quality of the M-representative-color-based compression data during the compressing the image based on M representative colors. The method further comprises comparing the indicator and a predetermined threshold to judge the image quality of the M-representative-color-based compression data; and performing operations, in response to judging that the image quality is low, comprising compressing the image based on N representative colors to generate N-representative-color-based compression data, where N and M each represents the number of representative colors and satisfy N>M. Each of the compressing the image based on M representative colors and the compressing the image based on N representative colors includes dividing the image into a plurality of blocks, extracting representative colors from each of the blocks, and assigning one of the representative colors to each pixel in the blocks.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIGS. 5A to 5D are diagrams showing an example of compression based on representative colors;

FIG. 6 is a diagram showing an example of image conversion from six representative colors to four representative colors;

FIGS. 12A and 12B are diagrams showing an example of compression based on six representative colors;

DETAILED DESCRIPTION

Figure 1:
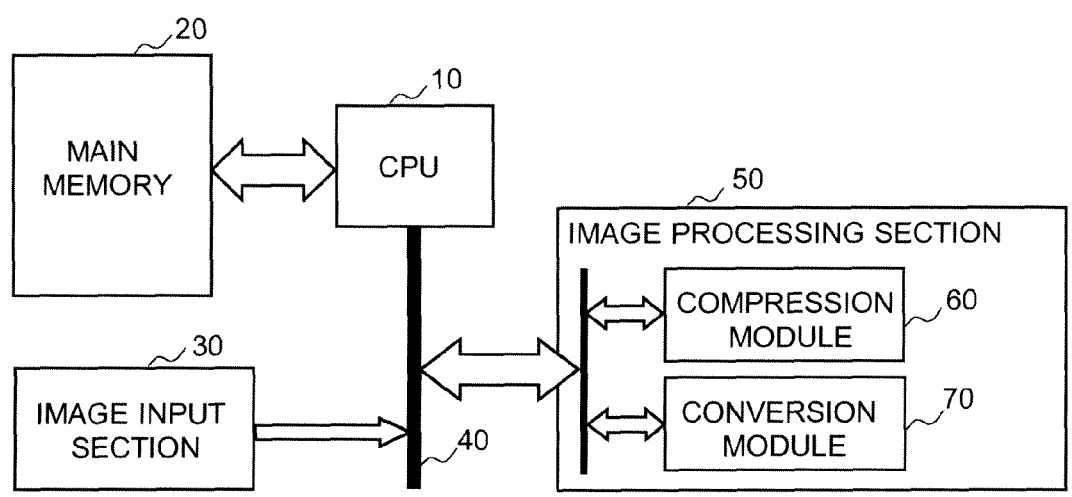
FIG. 1 is a block diagram showing the structure of an image processing system according to one example of the present invention.

Illustrative embodiments of image processing apparatuses and image compressing methods will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to an image processing apparatus and image compressing method as embodiments of the present invention, in compression of image data based on representative colors, the following operations are performed. When compression processing is performed based on N representative colors, an indicator to indicate the degree of image quality deterioration due to the reduction of the number of representative colors to M (N>M) is calculated, and the calculated indicator is compared with a predetermined threshold value. In the result of the comparison, in the case where it can be judged that image quality deterioration is small, the N-representative-color-based compression data are recompressed (converted) into M-representative-color-based compression data. Accordingly, compression can be performed based on representative colors efficiently with high compression ratio while suppressing image quality deterioration.

Further, the M-representative-color-based compression data are not produced from the original non-compression image data, and the N-representative-color-based compression data are converted into the M-representative-color-based compression data. Accordingly, since there is no need to retain the original non-compression image data, memories can be utilized efficiently. Herein, in this specification, each of N and M is a positive number and represents the number of representative colors.

As described in the above description about the background, in an image compressing technique employed as one of common image compressing techniques, the color of each pixel in a block is replaced with one of representative colors. In the case where the number of colors used in a block is larger than the predetermined number of representative colors, since the reduction of the number of colors occurs, image quality deterioration may take place. In order to prevent the image quality deterioration, it is necessary to perform compression processing with the increased number of representative colors. However, if the number of representative colors is increased, high compression ratio is hardly attained.

As a technique to attain high compression ratio while suppressing image quality deterioration, it may be considered to perform compression processing again by increasing or decreasing the number of representative colors. However, according to this technique, the production of compression data takes much time, and memories are occupied for retaining the original image. Further, also, as another technique, it may be considered to evaluate image quality before compression so as to determine the number of representative colors. However, according to this technique, also, the production of compression data takes much time, and since processing to evaluate an image is newly needed, the processing becomes complicate.

According to a preferable embodiment of the present invention, the following processes are performed in an image compressing method configured to divide an image into rectangular blocks with a specific size, to extract representative colors in a rectangular block, and to replace the color of each pixel in the block with one of the extracted representative colors so that the image is compressed. The number of representative colors to be extracted in the first compression processing is set to N, images in one page are subjected to compression processing based on the N representative colors so as to produce compression data, and the N-representative-color-based compression data are output. At the time of this compression processing, an indicator (hereafter, called as an indicator for evaluating image quality) to indicate a degree of image deterioration in the case where compression processing is performed based on M representative colors (N>M) is calculated, and the indicator is output together with the N-representative-color-based compression data.

After the above compression processing has been completed, the indicator for evaluating image quality is referred and compared with a predetermined threshold value so as to judge whether the indicator for evaluating image quality is larger than the threshold value. In the result of the comparison, in the case where the indicator for evaluating image quality is larger than the threshold value (in the case where image quality deterioration is large), it is judged that recompression based on M colors is not applicable, and the N-representative-color-based compression data are made to the final compression data. Meanwhile, in the case where the indicator for evaluating image quality is equal to or smaller than the threshold value (in the case where image quality deterioration is small), it is judged that recompression based on M colors is applicable, processing to recompress the N-representative-color-based compression data into M-representative-color-based compression data is performed. With this, compression can be performed based on representative colors efficiently with high compression ratio while suppressing image quality deterioration.

Further, when the M-representative-color-based compression data are produced, the N representative colors-based compression data are converted into the M-representative-color-based compression data without performing the compression processing again by using the original image data. With this, since there is no need to retain the original image data, memories can be utilized efficiently.

FIRST EXAMPLE

Figure 2:
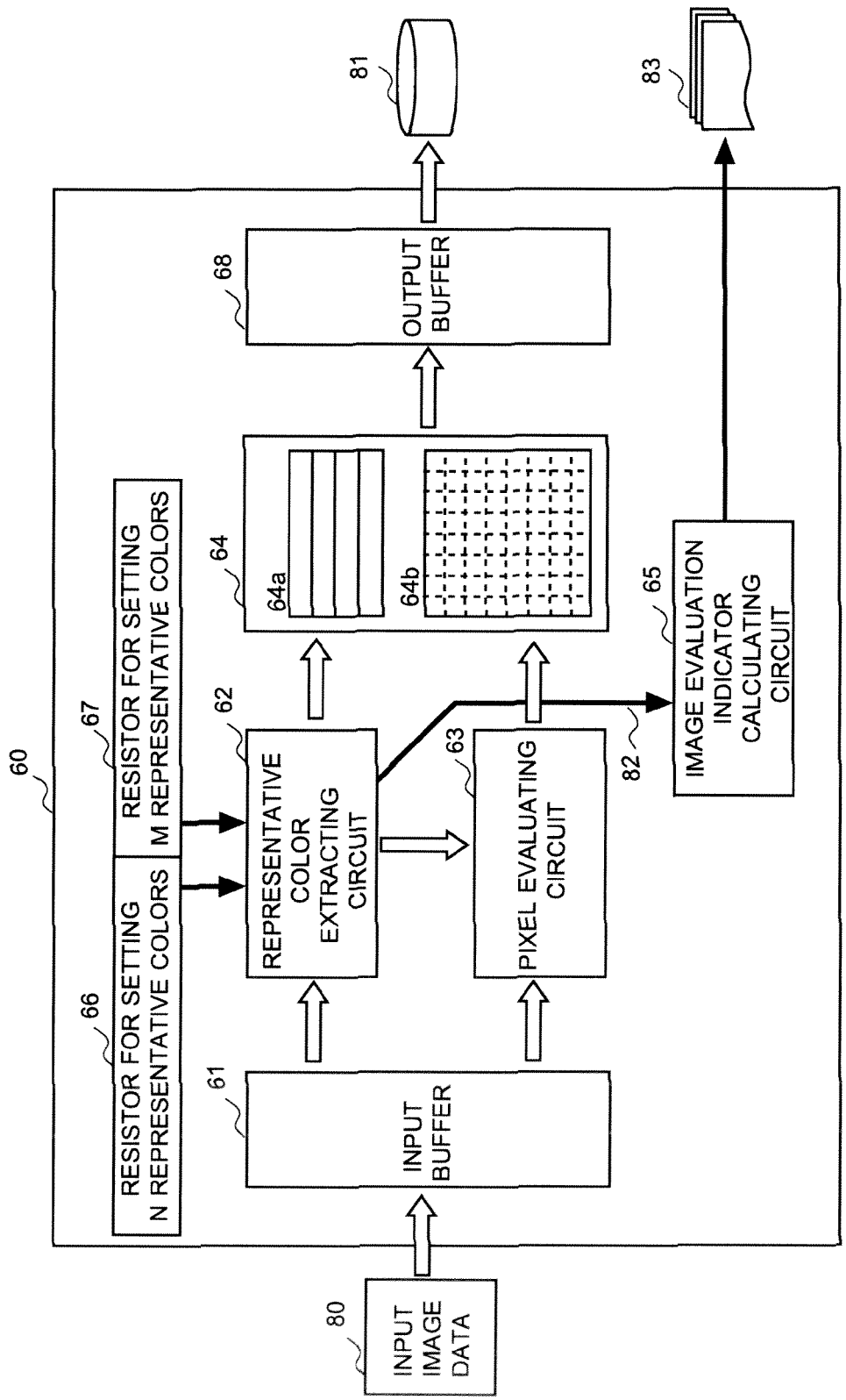
FIG. 2 is a block diagram showing the structure of a compression module of an image processing section according to one example of the present invention.
Figure 3:
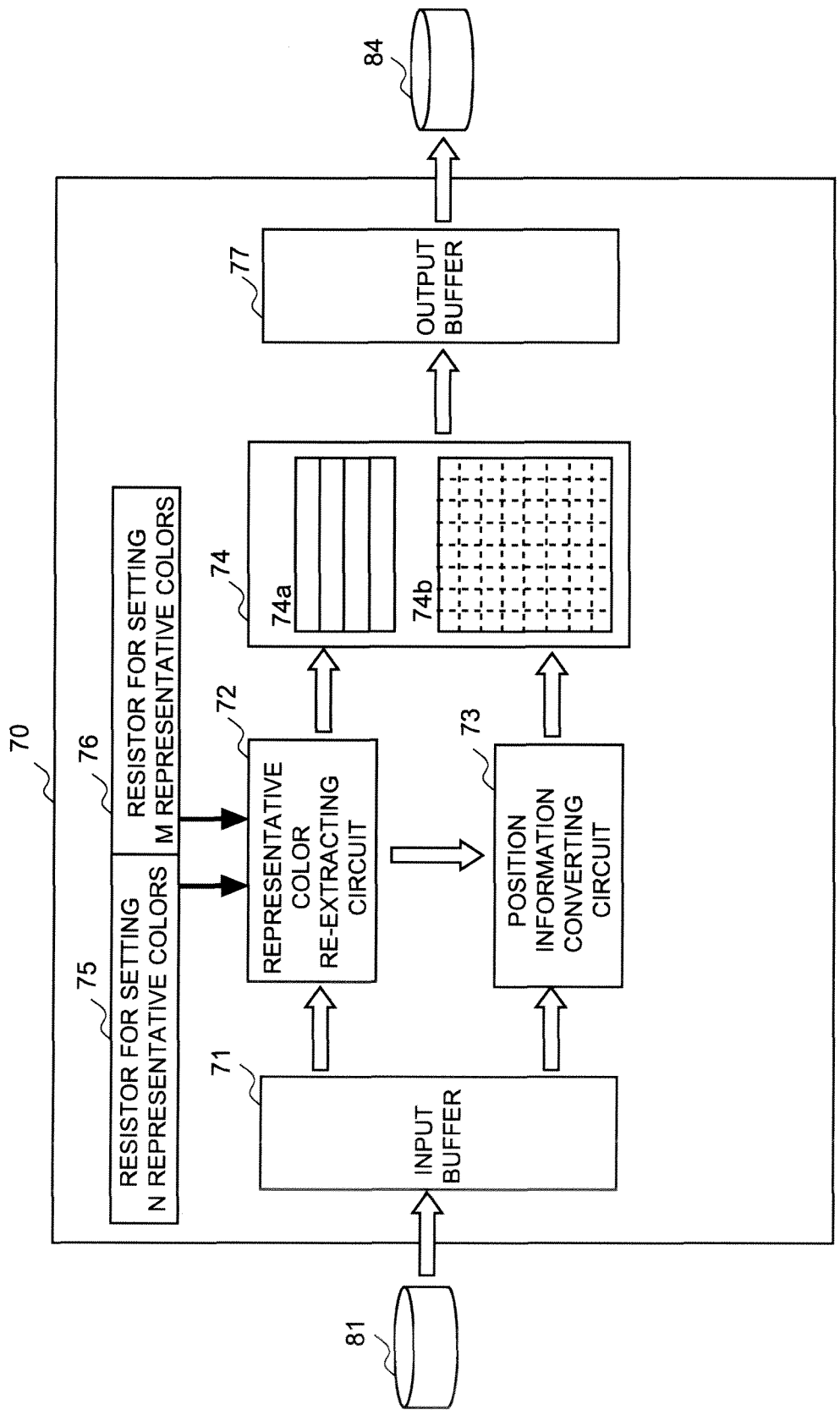
FIG. 3 is a block diagram showing the structure of a conversion module of the image processing section according to one example of the present invention.
Figure 4:
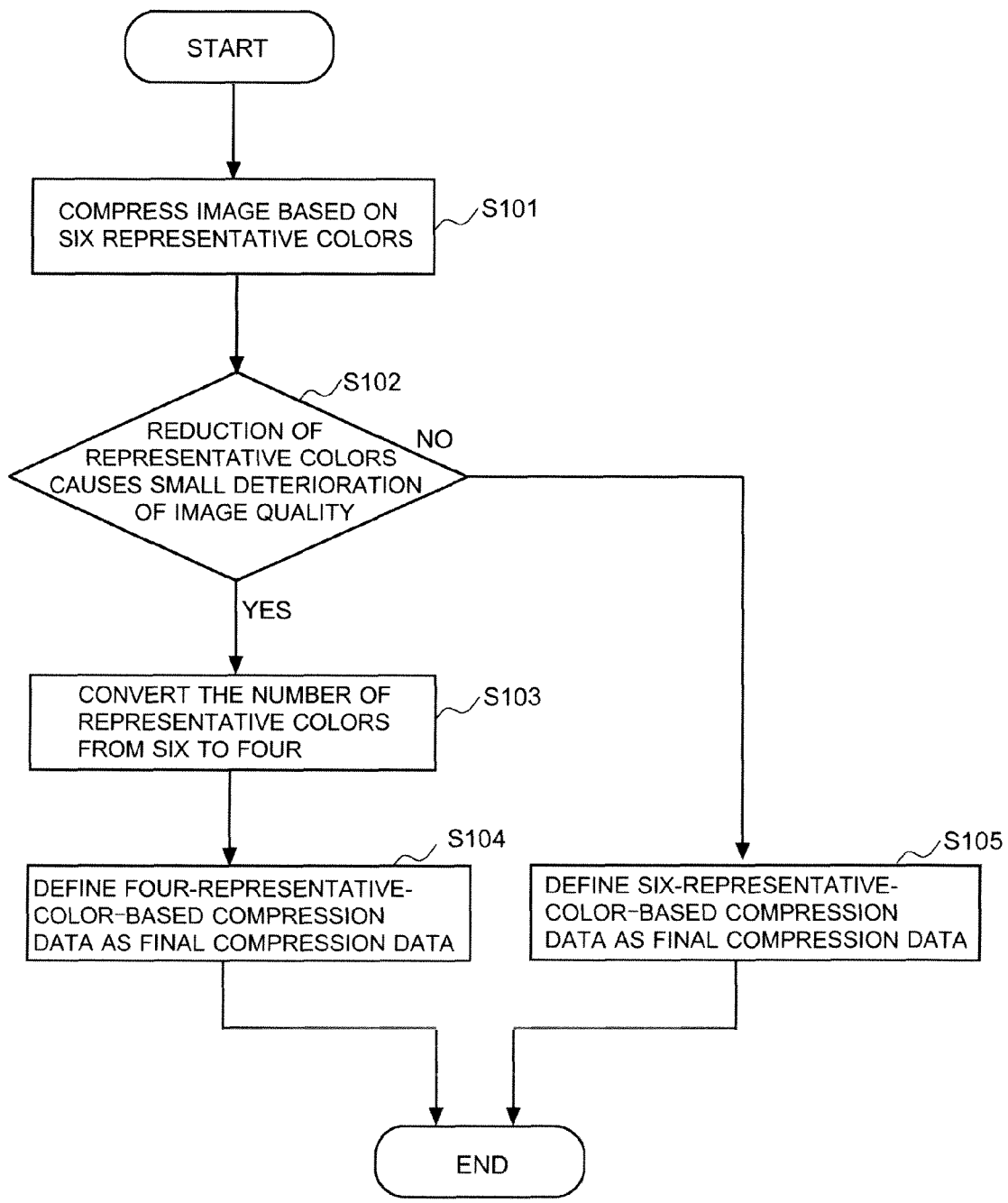
FIG. 4 is a flow chart diagram showing the actions of an image processing apparatus according to one example of the present invention.
Figure 7:
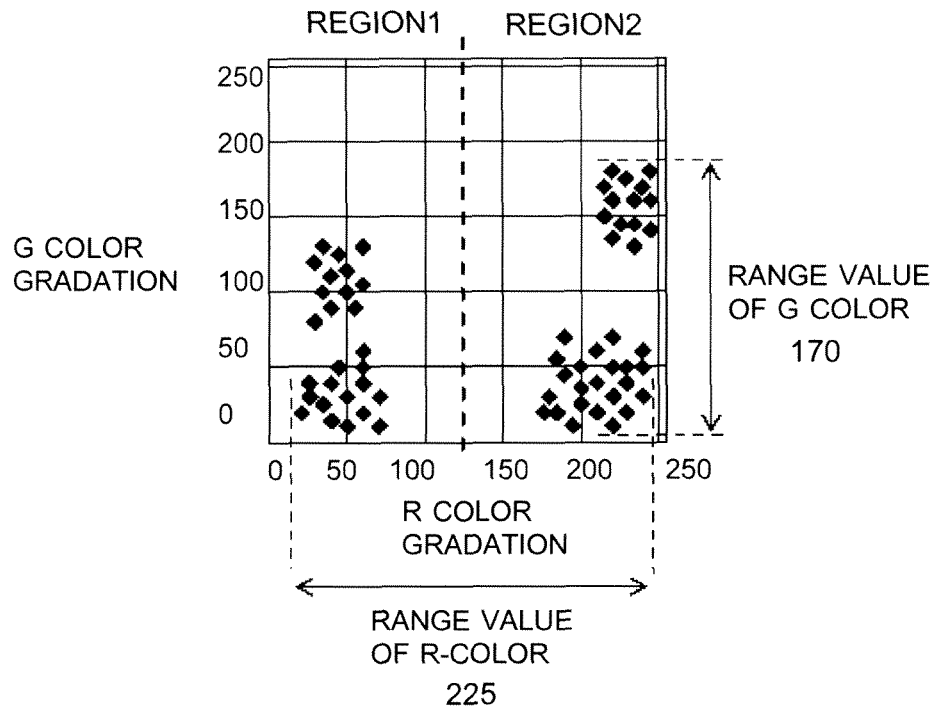
FIG. 7 is a diagram showing a representative color extracting method (one example of division into two regions)
Figure 8:
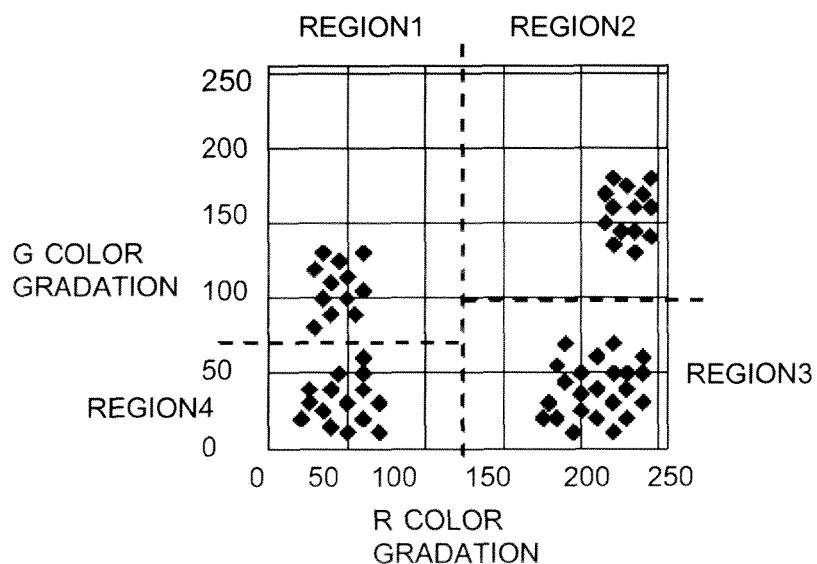
FIG. 8 is a diagram showing a representative color extracting method (one example of division into four regions)
Figures 9, 10:
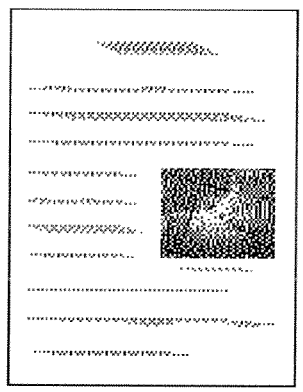
FIG. 9 is a diagram showing an example of distribution of gradation ranges of respective colors at the time of division into four regions.
FIG. 10 is an illustration showing an example of an image in which a page average range tends to be lower.
Figure 11A:
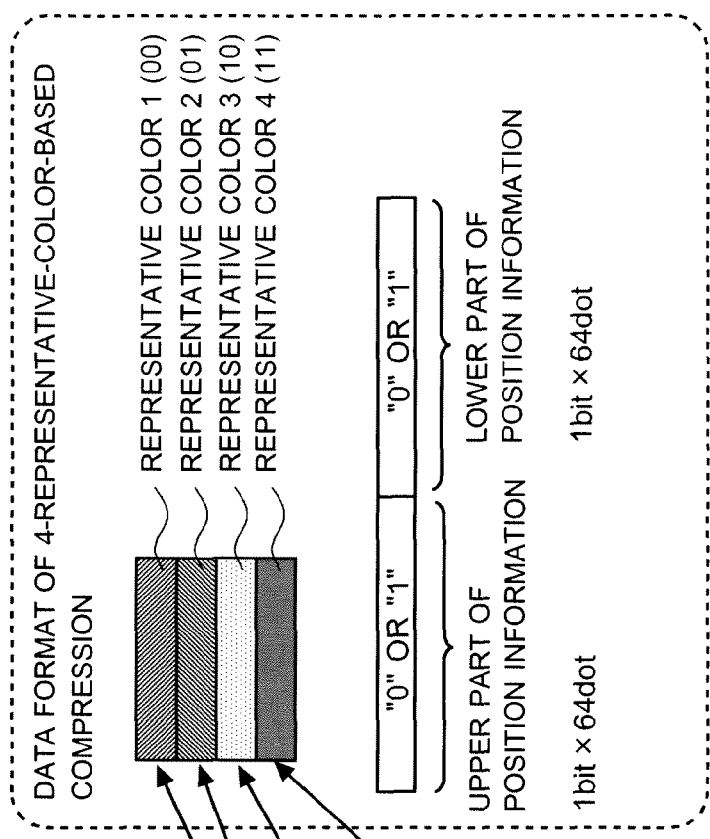
FIGS. 11A and 11B are diagrams showing an example of compression based on four representative colors.
Figure 11B:
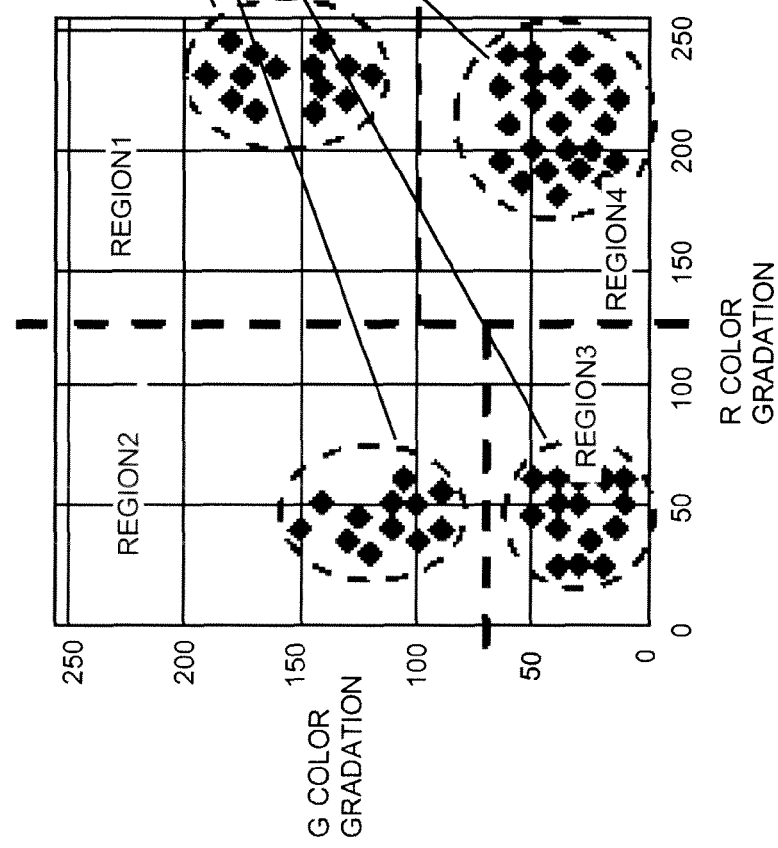
Figure 13B:
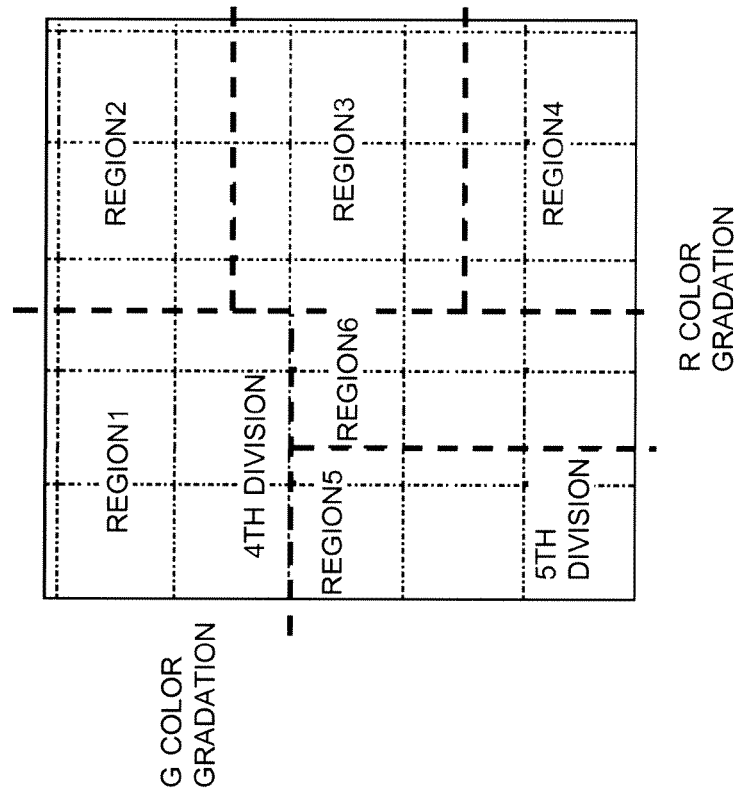
FIGS. 13A and 13B are diagrams showing an example of exceptional division.
Figure 13A:
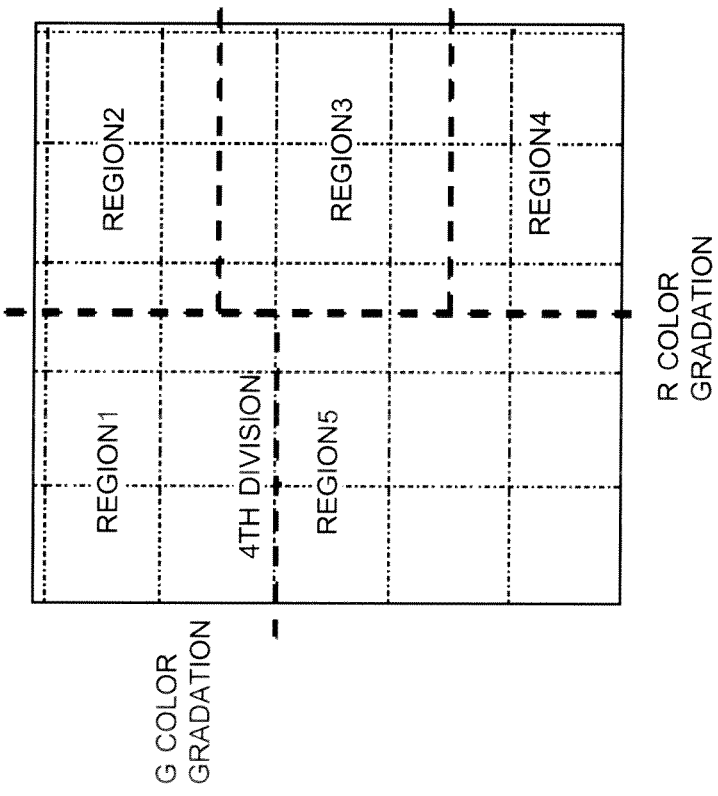

In order to describe the above-mentioned preferable embodiment of the present invention more in detail, description will be given to an image processing apparatus and image compressing method according to the first example of the present invention with reference to FIG. 1 through FIG. 13A. FIG. 1 is a block diagram showing the structure of an image processing system of the present example. Further, FIG. 2 is a block diagram showing the structure of a compression module of an image processing section of the present example; FIG. 3 is a block diagram showing the structure of a conversion module; and FIG. 4 is a flowchart showing the actions of an image processing apparatus of the present example. FIGS. 5A to 5D are diagrams showing an example of compression based on representative colors; and FIG. 6 is a diagram showing an example of conversion from six representative colors to four representative colors. Each of FIGS. 7 and 8 is a diagram showing a representative color extracting method; FIG. 9 is a diagram showing an example of distribution of respective color gradation ranges at the time of division into four regions; and FIG. 10 is an illustration showing an example of an image in which a page average range tends to lower. FIGS. 11A and 11B are diagrams showing an example of compression based on four representative colors; FIGS. 12A and 12B are diagrams showing one example of compression based on six representative colors; and FIGS. 13A and 13B are diagrams showing an example of exceptional division.

As shown in FIG. 1, the image compression processing of the present example is performed under a system environment in which a CPU (Central Processing Unit) 10 is coupled to a main memory 20, such as a ROM (Read Only Memory) and a RAM (Random Access Memory) and the CPU 10 is further coupled to an image input section 30 and an image processing section 50, via a bus 40.

The CPU 10 and the main memory 20 constitute a control section. The control section is configured to acquire a below-mentioned indicator for evaluating image quality from a compression module 60, to compare the indicator for evaluating image quality with a preliminarily-memorized threshold value, and to judge based on the comparison result whether reduction of the number of representative colors causes a deterioration of image quality or not. When judging that the reduction does not cause a deterioration of image quality, the control section instructs a conversion module 70 to recompress compression data. The image input section 30 is configured to acquire image data used as a compression target. The image processing section 50 includes a compressing section (called as a compression module 60) to compress image data and a converting section (called as a conversion module 70) to convert compression data.

These elements may be incorporated in a single apparatus, such as a multifunction machine (MFP: Multi Function Peripheral); or the image input section 30 may be separated as another apparatus. Further, in the present example, the control section is configured to judge whether image quality deteriorates. However, the image processing section 50 (compression module 60) may be configured to perform such judgment. Hereafter, the compression module 60 and the conversion module 70 will be described in detail.

Compression Module:

As shown in FIG. 2, the compression module 60 includes an input buffer 61, a representative color extracting circuit 62, a pixel evaluating circuit 63, a work memory 64, an image quality evaluation indicator calculating circuit 65, a register for setting N representative colors 66, a register for setting M representative colors 67, an output buffer 68, and the like. In the following description, it is presupposed that image quality in the case of compression processing based on four representative colors is evaluated during compression processing based on six representative colors.

The input image data 80 represent a piece of data divided into blocks each of which has a predetermined size (for example, 8×8 dots). When the input image data 80 are input to the compression module 60, the input image data 80 are stored in the input buffer 61. The representative color extracting circuit 62 checks the color information data of each pixel of a target block stored in the input buffer 61, and extracts N representative colors (here, N is six, i.e., six representative colors) set at a register for setting N representative colors 66. At this time, the information of the extracted representative colors is stored in the work memory 64 as representative color information data 64a. Further, in the process of extraction of representative colors, on completion of the extraction of M representative colors (here, M is four, i.e., four representative colors) set at a register for setting M representative colors 67, the representative color extracting circuit 62 outputs an indicator for evaluating block image quality 82 in the case where the target block is compressed based on the M representative colors, to the image quality evaluation index calculating circuit 65.

The pixel evaluating circuit 63 compares the color of each pixel of the target block with the N representative colors extracted by the representative color extracting circuit 62, selects a representative color nearest to the color for each pixel from the N representative colors, and stores the index number of the selected representative color as position information data 64b on the work memory 64. A combination of the representative color information data 64a and the position information data 64b becomes the N-representative-color-based compression data. When the compression processing for the target block has been completed, the pixel evaluating circuit 63 outputs the compression data on the work memory 54 as the N-representative-color-based compression data 81 through the output buffer 68.

The image quality evaluation indicator calculating circuit 65 receives an indicator for evaluating block image quality 82 output for each time when the representative color extracting circuit 62 has processed a target block, and adds up the respective values of the indicators for evaluating block image quality 82 of blocks corresponding to one page. When the processing for the one page has been completed, the image quality evaluation indicator calculating circuit 65 divides the sum of the values by the total number of the blocks, thereby obtaining the average value of the indicators for evaluating block image quality 82 of the whole page. Further, if needed, the image quality evaluation indicator calculating circuit 65 retains the maximum value of the indicators for evaluating block image quality 82 in the page. The image quality evaluation indicator calculating circuit 65 further outputs the average value and the maximum value of the indicators for evaluating block image quality 82 obtained after the compression processing for the one page has been completed outputs as an indicator for evaluating page image quality 83.

Conversion Module:

As shown in FIG. 3, the conversion module 70 includes an input buffer 71, a representative color re-extracting circuit 72, a position information converting circuit 73, a work memory 74, a register for setting N representative colors 75, a register for setting M representative colors 76, an output buffer 77, and the like. In the following description, it is presupposed that six-representative-color-based compression data are converted into four-representative-color-based compression data.

The N-representative-color-based compression data 81 represents a piece of compression data obtained by performing compression processing based on N representative colors (N=6) for input image data wherein a piece of data is divided into blocks each of which has a size of 8×8 dots. When the compression data are input to the conversion module 70, the compression data are stored in the input buffer 71. The representative color re-extracting circuit 72 checks the representative color information data and position information data of the N-representative-color-based compression data 81 stored in the input buffer 71, converts the N representative color information data (N=6) into M representative color information data (M=4) set at register for setting M representative colors 76, and stores the M representative color information data in the work memory 74 as representative color information data 74a. For example, the conversion from the N representative colors (N=6) into the M representative colors (M=4) is achieved by merging the fifth and sixth representative colors among the N representative colors (N=6) into any of the first to fourth representative colors. At this time, the representative color re-extracting circuit 72 outputs the conversion information of the index numbers which indicates that each of the fifth and sixth representative colors is merged into which one of the first to fourth representative colors, to the position information converting circuit 73.

The position information converting circuit 73 takes in the position information data of the N-representative-color-based compression data 81 from the input buffer 71, and then, receives the conversion information of the representative color index numbers from the representative color re-extracting circuit 72. Successively, the position information converting circuit 73 converts the position information data of the N-representative-color-based compression data 81 into the position information data of the M-representative-color-based compression data based on the conversion information of the representative color index numbers, and stores the position information data of the M-representative-color-based compression data in the work memory 74 as position information data 74b. A combination of the representative color information data 74a and the position information data 74b becomes compression data after the conversion processing, and the position information converting circuit 73 outputs the compression data on the work memory 74 as the M-representative-color-based compression data 84 via the output buffer 77.

The actions of the image processing apparatus with the above-mentioned structures will be described with reference to the flow chart diagram shown in FIG. 4.

First, non-compression image data acquired from the image input section 30 are stored in the main memory 20. Next, the non-compression image data on the main memory 20 are input into the compression module 60; and the compression module 60 performs compression processing based on six representative colors and stores compression data in the main memory 20 (S101). At this time, simultaneously with the execution of the compression processing, the compression module 60 outputs an indicator for evaluating image quality to evaluate the degree of image quality deterioration in the case where the number of representative colors is reduced to four.

This indicator for evaluating image quality is taken into the CPU 10, and the CPU 10 judges whether a reduction of the number of representative colors causes small deterioration of an image quality (S102). Concretely, the CPU 10 judges whether the degree of image quality deterioration is small or large, by comparing the indicator for evaluating image quality with a preliminarily-set threshold value. At this time, in the case where it has been known beforehand that high image quality is required or not required for input image data, the CPU 10 controls the number of representative colors to change appropriately for each job or each page by increasing or decreasing the threshold value.

On judging that the degree of image quality deterioration due to the reduction of the number of representative colors into four is small, the CPU 10 inputs six-representative-color-based compression data stored in the main memory 20 into the conversion module 70, and then, the conversion module 70 converts the six-representative-color-based compression data into four-representative-color-based compression data (S103), and stores the converted four-representative-color-based compression data as the final compression data in the main memory 20 (S104). On the other hand, on judging that the degree of image quality deterioration due to the reduction of the number of representative colors into four is large, the CPU 10 does not perform color number reduction processing to reduce the number of representative colors, and makes the six-representative-color-based compression data stored at this time in the main memory 20 as the final compression data (S105).

Next, the compression performed based on representative colors in the present example will be described specifically with reference to drawings.

First, four representative colors are extracted from the color information data (color and gradation are expressed by the type of hatching in FIG. 5A) of pixels which constitutes an input image block (presupposed to have a size of 8×8 dots) shown in FIG. 5A, and, as shown in FIG. 5B, index numbers of two bits are provided sequentially to the extracted four representative colors respectively. Next, for the color information data of each of pixels, as a comparison target pixel, which constitute the input image block shown in FIG. 5A, a representative color having the nearest color is selected from the representative colors shown in FIG. 5B based on the color information data of each of the representative colors, and the index number of the selected representative color is arranged at the position of the comparison target pixel of the pixels. With this processing, the position information data are obtained as shown in FIG. 5C. A combination of the representative color information data shown in FIG. 5B and the position information data shown in FIG. 5C becomes four-representative-color-based compression data for the input image block shown in FIG. 5A. In the image after the compression processing, as shown in FIG. 5D, the reduction of the number of colors is caused due to the replacement of colors.

Then, in the present example, first, compression based on representative colors is performed by making the number of representative colors to six. Subsequently, in the case where the reduction of the representative colors causes considerable image quality deterioration, the six-representative-color-based compression data are used. On the other hand, in the case where the reduction of the representative colors does not cause considerable image quality deterioration, the six-representative-color-based compression data are converted into four-representative-color-based compression data.

Here, representative-color-based compression data are data of a combination of representative color information data and position information data. Accordingly, when data conversion processing by the reduction of the number of representative colors is performed for the above data, the re-extraction of representative color information data and the conversion processing of position information data are performed. In the sequence of conversion, first, as shown in FIG. 6, processing is performed so as to re-extract four representative colors from the six representative colors. At this time, index numbers are provided to the extracted four representative colors respectively. With this, the conversion information of the index numbers in the position information data by converting the six representative colors into the four representative colors is acquired. Successively, the position information data are converted based on this conversion information so as to produce four representative color information data and position information data corresponding to the four representative color information data, whereby the conversion processing is completed. In the case shown in FIG. 6, the index numbers 000 and 100 are converted into the index number 00; the index numbers 001 and 101 are converted into the index number 01; and the index numbers 010 and 011 are converted into the index numbers 10 and 11 respectively.

Hereafter, each processing of the above-mentioned compression based on representative colors will be described. For the simplification, it is presupposed that the color information data of each pixel of an input image block are represented in a RGB color space; and that in each of all pixels in the input image block, the gradation of B (blue) color is made to 0 and only R (red) and G (green) colors are taken into consideration at the time of extraction processing of representative colors.

Extraction Processing of Representative Colors:

First, the color information data of each of all the pixels of an input image block are plotted in a graph as shown in FIG. 7. Here, since the gradation of the B color is 0 in all the pixels, FIG. 7 shows only the R and G colors. Next, a range value (maximum value to minimum value) is calculated based on the maximum value and minimum value of the gradation of each of the R color and the G color. In the case of FIG. 7, the range value of the R color is 225, and the range value of the G color is 170. Among them, the R color having a larger range value is selected. Next, the intermediate value of the range value of the selected color is made to a threshold value, a region is divided based on the threshold value so as to produce two regions, and the produced regions are called as a region 1 and a region 2.

Hereafter, the following operations are performed for each of all the produced regions. The range value of each color is calculated, and among them, a region including a color having the maximum range value is selected. Successively, the intermediate value of the range value of a color having a larger range value in the selected region is made to a threshold value, and the selected region is divided into two regions. The above processing is repeated until the number of produced regions becomes equal to the number of representative colors to be extracted. As a result of making divided regions by performing the above processing, it is assumed that the divided regions are prepared as shown in FIG. 8. Subsequently, the respective color information data of pixels in each of the divided regions are averaged so as to obtain representative colors.

Calculation Processing of Indicator for Evaluating Image Quality:

In the present example, it is presupposed that when compression is performed based on four representative colors, an indicator for evaluating image quality is calculated as an indicator to evaluate the image quality of an image after the compression processing. Further, in the extraction process of representative colors, a condition that four divided regions are provided by performing the region division processing by three times is supposed. On this condition, the range values of respective colors in each region are calculated. As a result, it is assumed that the range values of colors in each region are calculated as shown in FIG. 9.

First, the largest range value is selected from the respective range values of the respective colors of the regions. In the case where the selected range value is sufficiently small, in the region including the largest range value and the other regions, the color gradation of each pixel existing in the respective regions locates within a narrow range. Accordingly, even if the color information data of these pixels are replaced with a single representative color, image quality deterioration is small. Therefore, it can be judged that the necessity to increase the number of representative colors by performing the region division more is small. Consequently, when compression is performed based on four representative colors, the largest range value among the respective range values of the respective colors of the regions at the time of division of a region into four regions is made to an indicator for evaluating image quality after the compression processing (hereafter, written as a block range value).

In the case of FIG. 9, the block range value becomes 6. When the compression processing is performed for the image of one block, the block range value is an indicator for evaluating the image quality of the image of the one block. In order to make the block range value as an indicator for evaluating the image quality of one page so as to enable image quality evaluation for each page, the sum of the respective block range values of all blocks constituting one page is divided by the number of the blocks constituting the one page so as to calculate an average block range value (hereafter, written as a page average range). Then, by referring the value of the page average range, the CPU 10 judges image quality deterioration in the case where compression is performed based on four representative colors for page image data of a compression target.

In the case where only the above-mentioned page average range is made as an indicator for evaluating image quality, there may be the case where the image quality deterioration of the whole page after the compression processing cannot be evaluated correctly. For example, as shown in FIG. 10, in the case of page image data in which a monochromatic text document partially includes a high definition image, it is expected that the page average range becomes a small value. By referring only this value, it may be judged that even if the compression processing is performed based on four representative colors, image quality deterioration is small. However, actually, a block range value becomes large at the block constituting the high definition image, and there is possibility that remarkable image quality deterioration takes place on the part of the high definition image.

Then, in order to avoid occurrence of the above malfunction, the respective block range values of all blocks constituting one page are subjected to processing of peak-hold, and the finally-held value is made as the page largest range. In the case where the page largest range is a large value regardless of a sufficiently small value of the page average range, the CPU 10 can judge by referring the page largest range such that remarkable image quality deterioration may take place at a part of the page, whereby the evaluation of image quality deterioration can be achieved appropriately.

Color Number Reduction for Representative-Color-Based Compression Data:

In FIG. 11A, the color information data of each of all the pixels which constitute a block of 8×8 dots are plotted on a color space, and four divided regions are made based on the ranges of the color information data. In the case of compression based on four representative colors, on this condition, the average value of the respective color information data of pixels existing in a region is calculated for each of the regions, and the average value is made as the representative color of the corresponding one the regions. As shown in FIG. 11B, four-representative-color-based compression data are constituted by the representative color information data of each region and the position information data showing that each pixel in the block corresponds to which one of the four representative colors.

In the case of compression based on six representative colors, after four divided regions are made as shown in FIG. 11A, the region division is performed two times more so that the region is divided into six regions as shown in FIG. 12A. Thereafter, similar to the case of compression based on four representative colors, six representative colors are calculated, and six-representative-color-based compression data are constituted by the representative color information data and the position information data as shown in FIG. 12B.

When the above-mentioned six-representative-color-based compression data are converted into four-representative-color-based compression data, it is necessary to perform: (1) processing to reduce the number of representative colors from six to four by re-extracting representative color information data, (2) processing to convert the position information data into that for four representative colors, and (3) preliminarily processing at the time of performing compression based on the six representative colors. Hereafter, details are shown.

(1) Color Number Reducing Processing by Re-Extraction of Representative Color Information Data:

After four divided regions are made as shown in FIG. 11A, the region 1 is divided to produce a region 1 and a region 5, and the region 2 is divided to produce a region 2 and a region 6, which results in an example of six divided regions shown in FIG. 12A. The processing to reduce the number of representative colors from six to four is performed such that the representative colors 1 and 5 and the representative colors 2 and 6 in the six-representative-color-based compression data are merged so as to re-extract representative colors 1 and 2 respectively. When the representative colors 1 and 5 are merged so as to re-extract the representative color 1, the processing is performed in accordance with the following procedures.

Procedure 1:

The number of pixels (C1, C5) which correspond to the representative colors 1 and 5 respectively are counted from the position information data.

Procedure 2:

The color information data of the representative colors 1 and 5 are multiplied with the respective count values of the number of pixels as shown in the following expressions.

$$(R1, G1, B1) \times C1 = (R1 \times C1, G1 \times C1, B1 \times C1) \quad (1)$$

$$(R5, G5, B5) \times C5 = (R5 \times C5, G5 \times C5, B5 \times C5) \quad (2)$$

Procedure 3:

The respective multiplied values in Procedure 2 are added together, and the added value is divided by the sum of the respective counted values of the number of pixels of the representative colors (calculation of the average value) as shown in the following expression.

$$\{(R1 \times C1, G1 \times C1, B1 \times C1) + (R5 \times C5, G5 \times C5, B5 \times C5)\}/(C1+C5) = \text{(re-extraction values of representative color 1)} \quad (3)$$

The re-extraction of the representative color 1 is completed by the above-mentioned procedures. Similarly, the representative colors 2 and 5 are merged and the representative color 2 is re-extracted. Each of the representative colors 3 and 4 is used as it is. By the above procedures, the conversion from the six representative colors to the four representative colors is completed.

(2) Conversion of Position Information Data:

The position information data of the six-representative-color-based compression data (3 bits of each pixel) are converted into the position information data of four-representative-color-based compression data (2 bits of each pixel) as shown in Table 1.

TABLE 1

| Six RCCD* | | Four RCCD* |
|---|---|---|
| 000 | → | 00 |
| 001 | → | 01 |
| 010 | → | 10 |
| 011 | → | 11 |
| 100 | → | 00 |
| 101 | → | 01 |

*Remarks: Six RCCD represents six-representative-color-based compression data and Four RCCD represents four-representative-color-based compression data In the above position information data in Table 1, since the representative color 5 (100) is merged into the representative color 1, 100 is changed to 00. Also, since the representative color 6 (101) is merged into the representative color 2, 101 is changed to 01.

(3) The Preliminary Processing at the Time of Performing Compression Based on the Six Representative Colors:

When the re-extraction of the representative color information data at the above Item (1) is performed, it is necessary to add preliminary processing at the time of production of six-representative-color-based compression data. In the re-extraction processing of representative color information data, the processing to re-extract representative colors is performed such that regions produced by division after quadrisection (division into four regions) are merged into the original regions. In order to perform this processing, information to relate the regions produced by the division after the quadrisection with the original region which became the target region of the division, becomes necessary. That is, in the example shown in FIGS. 11A and 12A, since the region 1 is divided so as to produce the region 1 and the region 5, the region 5 is a newly produced region and the region 1 is the original region which became the target region of the division. In order to provide the above information in the compression data, the following rule in Table 2 is applied to the assignment of index numbers to representative colors produced from respective regions.

TABLE 2

| Rule 1 | |
|---|---|
| Region | Index |
| Region n representative color: | 000 |
| Region m representative color: | 001 |
| Region a representative color: | 010 |
| Region b representative color: | 011 |
| Region 5 representative color: | 100 |
| Region 6 representative color: | 101 |

Region n: a region which became a division target at the time of the 4th division
Region m: a region which became a division target at the time of the 5th division
Region 5: a region which was newly produced at the time of the 4th division
Region 6: a region which was newly produced at the time of the 5th division
Regions a and b: regions other than Regions n, m, 5, and 6

Here, as shown in FIGS. 13A and 13B, at the time of the fourth division, the region 1 becomes a division target, and the region 5 is newly produced (FIG. 13A). Further, at the time of the fifth division, the region 5 becomes a division target, and the region 6 is newly produced (FIG. 13B). In the above case, since Region m=5, the index assigning method shown in Rule 1 cannot be applied. Further, in FIGS. 13A and 13B, in the case where the region 1 becomes a division target at the time of the fifth division, similarly, Rule 1 is hardly applied. As mentioned above, in the case where the region n or the region 5 becomes a division target at the time of the fifth division, Rule 1 is hardly applied. Accordingly, in this case, the following rule in Table 3 is applied to the assignment of index numbers.

TABLE 3

| Rule 2 | |
|---|---|
| Region | Index |
| Region n representative color: | 000 |
| Region a representative color: | 001 |
| Region b representative color: | 010 |
| Region c representative color: | 011 |
| Region 5 representative color: | 110 |
| Region 6 representative color: | 111 |

Region n: a region which became a division target at the time of the 4th division
Region 5: a region which was newly produced at the time of the 4th division
Region 6: a region which was newly produced at the time of the 5th division
Regions a, b, and c: regions other than Regions n, 5, and 6

Thus, by assigning indexes in accordance with Rule 1 or 2, it becomes possible to discriminate easily how to merge which representative color into which representative color at the time of the re-extraction processing of representative colors. Namely, in the case where indexes are assigned in accordance with Rule 1, a representative color with an index 100 is made to be merged into a representative color with an index 000, and a representative color with an index 101 is made to be merged into a representative color with an index 001. Further, in the case where indexes are assigned in accordance with Rule 2, representative colors with index 000, 110, and 111 are made to be merged. Therefore, at the time of re-extraction processing of representative colors, depending on whether the index 110 and 111 are included in the position information data at the stage of Procedure 1 (counting the number of pixels), it becomes possible to discriminate the indexes assigned in accordance with which one of Rule 1 and Rule 2.

As described above, at the time of compression of image data based on representative colors, when compression processing is performed based on N representative colors, an indicator for evaluating image quality to indicate image quality deterioration due to the reduction of the number of representative colors to M (N>M) is calculated. Successively, the indicator for evaluating image quality is compared with a threshold value, and from the comparison result, when it can be judged that image quality deterioration is not estimated so much, the N-representative-color-based compression data are recompressed to the M-representative-color-based compression data, whereby a more high compression ratio can be attained while suppressing the image quality deterioration. Further, the M-representative-color-based compression data can be produced directly from the N-representative-color-based compression data. Accordingly, since there is no need to retain the original non-compression image data, the memory can be utilized efficiently.

SECOND EXAMPLE

Next, description will be given to an image processing apparatus and image processing method according to the second example of the present invention.

Figure 14:
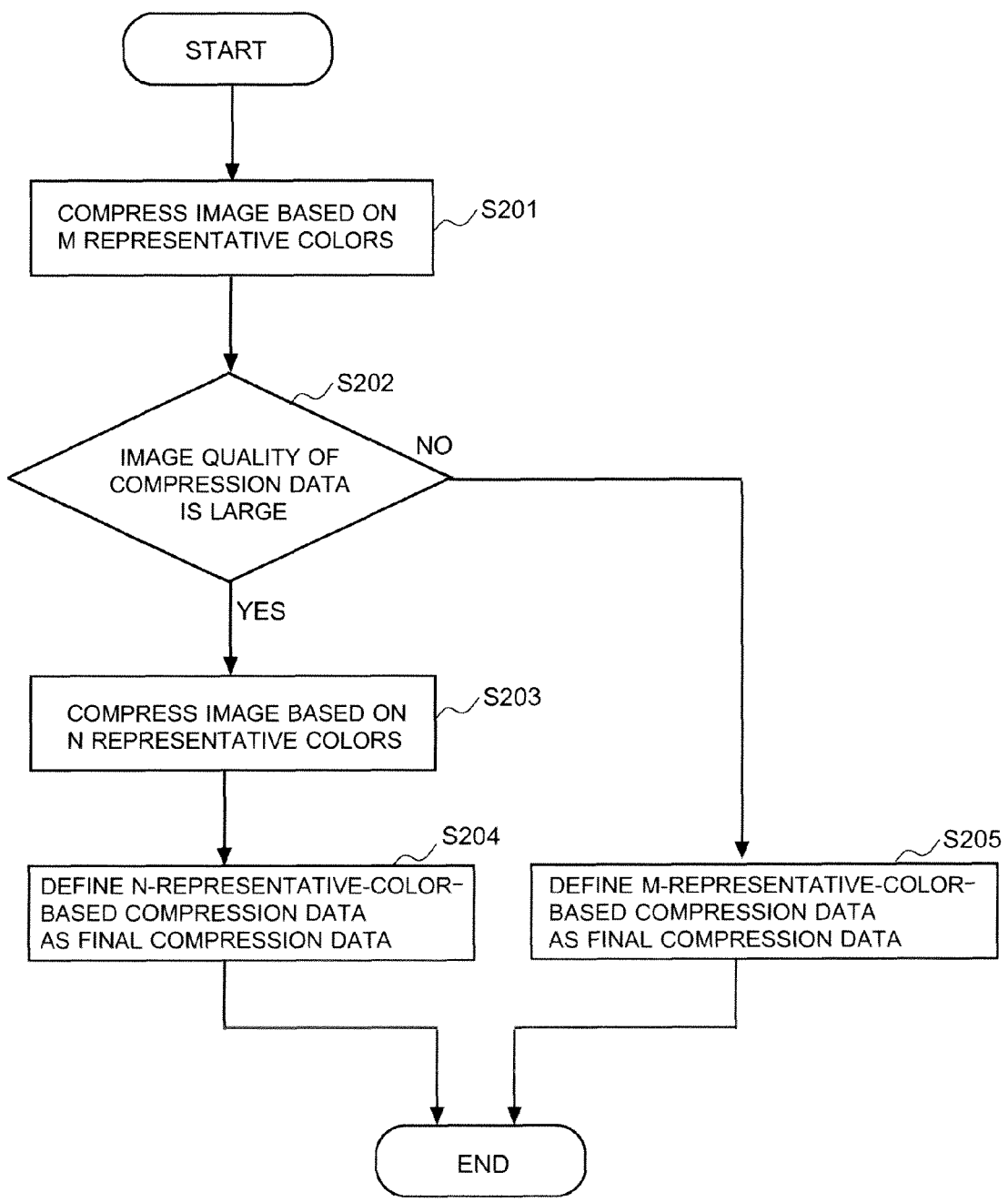
FIG. 14 is a flow chart diagram showing the actions of an image processing apparatus according to one example of the present invention.

In the above-mentioned first example, in the first compression processing, compression is performed based on N representative colors. After this compression has been completed, if it is judged that it is applicable to recompress to M representative colors (N>M), the processing to convert the N-representative-color-based compression data into M-representative-color-based compression data is performed. However, in the first compression processing, it is possible to perform compression based on the M representative colors (see FIG. 14).

In this case, in the process that the compression is performed based on the M representative colors, an indicator for evaluating image quality is calculated (S201). After the compression processing based on the M representative colors has been completed, the image quality of the M-representative-color-based compression data is evaluated based on the indicator for evaluating image quality (S202). As a result, if image quality deterioration is large, the M-representative-color-based compression data are discarded, and compression is performed again based on the N representative colors (N>M) (S203) to be the final compression data (S204). Meanwhile, if image quality deterioration is small, the first M-representative-color-based compression data are made to the final compression data (S205).

Even in this constitution, since it is possible to evaluate the image quality of the M-representative-color-based compression data appropriately by use of the indicator for evaluating image quality produced at the time of the compression processing based on the M representative colors, it becomes possible to suppress image quality deterioration. Further, since compression data are produced based on the small number of representative colors, in the case where image quality deterioration does not occur even with compression based on the small number of representative colors, such as, in the case where the number of colors contained in an image before compression is small, and in the case of an extremely monotonous image, it becomes possible to shorten the time necessary to produce compression data.

THIRD EXAMPLE

Next, description will be given to an image processing apparatus and image processing method according to the third example of the present invention.

In the above-mentioned first example, in the first compression processing, the N-representative-color-based compression data are once written in the main memory 20. Subsequently, when the N-representative-color-based compression data are converted into the M-representative-color-based compression data (N>M), the N-representative-color-based compression data stored in the main memory 20 are input again into the conversion module 70. However, in the case where the image processing apparatus includes a local memory, the initial N-representative-color-based compression data may be stored in the local memory without being written in the main memory 20.

In this case, when the necessity of recompression is judged in the image processing apparatus, in the case where it is judged that the recompression is necessary, the N-representative-color-based compression data on the local memory are input into the conversion module 70, and converted into M-representative-color-based compression data in the conversion module 70, and then the M-representative-color-based compression data are written in the main memory 20. Meanwhile, in the case where it is judged that the recompression is not necessary, the N-representative-color-based compression data on the local memory are written into the main memory 20 without conversion. With this, the process to write in the main memory is performed only one time. Accordingly, processing of the control section in the compression processing can be simplified.

While the present example of the present invention have been described using specific terms, such description is for illustrative purpose only, and it is to be understood that changes and variations may be made without depending from the spirit or scope of the appended claims.

For example, in each of the examples, description is given to the case where N is 6 and M is 4. However, N and M can be set optionally as long as N and M are respective positive numbers and satisfy the relationship of N>M.

The invention claimed is:

1. An image processing apparatus for compressing an image, comprising:
    a compressing section configured to perform operations comprising
        compressing the image based on N representative colors to generate N-representative-color-based compression data and
        calculating an indicator for evaluating an image quality of the image compressed based on M representative colors during the compressing the image based on N representative colors, N and M each representing a number of representative colors and satisfying M<N, the compressing the image including dividing the image into a plurality of blocks, extracting representative colors from each of the blocks, and assigning one of the representative colors to each pixel in the blocks;
    a control section configured to compare the indicator and a predetermined threshold to judge whether a reduction of a number of representative colors of the N-representative-color-based compression data from N colors to M colors causes a deterioration of an image quality or not; and
    a converting section configured to reduce the number of the representative colors of the N-representative-colorbased compression data from N colors to M colors to generate M-representative-color-based compression data in response to judging that the reduction of the number of the representative colors does not cause the deterioration of the image quality.

2. The image processing apparatus of claim 1, further comprising a main storing section and a second storing section,
wherein the compressing section is configured to store the N-representative-color-based compression data into the second storing section, and to write the N-representative-color-based compression data into the main storing section in response that the judging does not cause the reducing the number of the representative colors of the N-representative-color-based compression data from N colors to M colors, and
the converting section is configured to read the N-representative-color-based compression data from the second storing section and write the M-representative-color-based compression data to the main storing section, during the reducing the number of the representative colors of the N-representative-color-based compression data from N colors to M colors.

3. The image processing apparatus of claim 1,
wherein the control section is configured to vary the threshold in quantity corresponding to an image quality desired for the image.

4. The image processing apparatus of claim 1,
wherein the compressing section is configured to, during the compressing the image based on N representative colors, calculate range values for each of M regions on each of the blocks being divided into M regions in a color space, the range values each representing a difference between a maximum value and a minimum value of a gradation of each of colors constituting the color space,
select a maximum range value from range values of the colors for the M regions to define a block range value for each of the blocks, and
calculate an average range value by dividing a total sum of block range values of all the blocks constituting the image by a number of the blocks, and
the control section is configured to judge, in response to a condition that the average range value is larger than the threshold, that the reduction of the number of the representative colors of the N-representative-color-based compression data from N colors to M colors causes a deterioration of the image quality.

5. The image processing apparatus of claim 1,
wherein the compressing section is configured to, during the compressing the image based on N representative colors, calculate range values for each of M regions on each of the blocks being divided into M regions in a color space, the range values each representing a difference between a maximum value and a minimum value of a gradation of each of colors constituting the color space,
select a maximum range value from range values of the colors for the M regions to define a block range value for each of the blocks,
select a maximum block range value from block range values of all the blocks constituting the image to define a maximum block range value, and
calculate an average range value by dividing a total sum of block range values of all the blocks constituting the image by a number of the blocks, and
the control section is configured to judge, in response to a condition that one of the average range value and the maximum block range value is larger than the threshold, that the reduction of the number of the representative colors of the N-representative-color-based compression data from N colors to M colors causes a deterioration of the image quality.

6. An image compressing method for compressing an image, comprising:
performing operations comprising
compressing the image based on N representative colors to generate N-representative-color-based compression data and
calculating an indicator for evaluating an image quality of the image compressed based on M representative colors during the compressing the image based on N representative colors, N and M each representing a number of representative colors and satisfying M<N, the compressing the image including dividing the image into a plurality of blocks, extracting representative colors from each of the blocks, and assigning one of the representative colors to each pixel in the blocks;
comparing the indicator and a predetermined threshold to judge whether a reduction of a number of representative colors of the N-representative-color-based compression data from N colors to M colors causes a deterioration of an image quality or not; and
reducing the number of the representative colors of the N-representative-color-based compression data from N colors to M colors to generate M-representative-color-based compression data in response to judging that the reduction of the number of the representative colors does not cause the deterioration of the image quality.

7. The image compressing method of claim 6,
wherein the image compression method is executed in an image processing apparatus comprising a main storing section and a second storing section,
the performing operations comprises storing the N-representative-color-based compression data into the second storing section, and writing the N-representative-color-based compression data into the main storing section in response that the judging does not cause the reducing the number of the representative colors of the N-representative-color-based compression data from N colors to M colors, and
the reducing the number of the representative colors comprises reading the N-representative-color-based compression data from the second storing section and writing the M-representative-color-based compression data to the main storing section, during the reducing the number of the representative colors of the N-representative-color-based compression data from N colors to M colors.

8. The image compressing method of claim 6,
wherein the comparing the indicator and a predetermined threshold comprises varying the threshold in quantity corresponding to an image quality desired for the image.

9. The image compressing method of claim 6,
wherein the compressing the image based on N representative colors, comprises calculating range values for each of M regions on each of the blocks being divided into M regions in a color space, the range values each representing a difference between a maximum value and a minimum value of a gradation of each of colors constituting the color space,
selecting a maximum range value from range values of the colors for the M regions to define a block range value for each of the blocks, and calculating an average range value by dividing a total sum of block range values of all the blocks constituting the image by a number of the blocks, and the comparing the indicator and the predetermined threshold comprises judging, in response to a condition that the average range value is larger than the threshold, that the reduction of the number of the representative colors of the N-representative-color-based compression data from N colors to M colors causes a deterioration of the image quality.

10. The image compressing method of claim 6, wherein the compressing the image based on N representative colors, comprises calculating range values for each of M regions on each of the blocks being divided into M regions in a color space, the range values each representing a difference between a maximum value and a minimum value of a gradation of each of colors constituting the color space, selecting a maximum range value from range values of the colors for the M regions to define a block range value for each of the blocks, selecting a maximum block range value from block range values of all the blocks constituting the image to define a maximum block range value, and calculating an average range value by dividing a total sum of block range values of all the blocks constituting the image by a number of the blocks, and the comparing the indicator and the predetermined threshold comprises judging, in response to a condition that one of the average range value and the maximum block range value is larger than the threshold, that the reduction of the number of the representative colors of the N-representative-color-based compression data from N colors to M colors causes a deterioration of the image quality.

\* \* \* \* \*